US012657430B2

(12) United States Patent
Yuan et al.

(10) Patent No.: US 12,657,430 B2
(45) Date of Patent: Jun. 16, 2026

(54) LOCAL INTERPRETABILITY ARCHITECTURE FOR A NEURAL NETWORK

(71) Applicant: INTERNATIONAL BUSINESS MACHINES CORPORATION, Armonk, NY (US)

(72) Inventors: Zhong Fang Yuan, Xi'an (CN); Tong Liu, Xi'an (CN); Li Ni Zhang, Beijing (CN); Wei Ting Hsieh, Tainan (TW); Huan Meng, Wuhan (CN); Qi Liang Zhou, Xi'an (CN); Jia Wei He, Xi'an (CN); Yi Fan Liu, Beijing (CN); Lin Ji, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 18/145,417

(22) Filed: Dec. 22, 2022

(65) Prior Publication Data

US 2024/0211727 A1    Jun. 27, 2024

(51) Int. Cl.
*G06N 3/042*         (2023.01)
(52) U.S. Cl.
CPC .................................... *G06N 3/042* (2023.01)
(58) Field of Classification Search
CPC ..................................................... G06N 3/042
See application file for complete search history.

(56) References Cited

U.S. PATENT DOCUMENTS

| | | | |
|---|---|---|---|
| 2019/0325333 A1 | 10/2019 | Chan et al. | |
| 2021/0117863 A1 | 4/2021 | Soleimani et al. | |
| 2021/0350211 A1 * | 11/2021 | Dalli ...................... | G06N 3/082 |
| 2022/0138532 A1 | 5/2022 | Dalli et al. | |
| 2022/0198277 A1 | 6/2022 | Nia et al. | |
| 2023/0093528 A1 * | 3/2023 | Sun .......................... | G06N 3/04 |
| | | | 706/26 |

FOREIGN PATENT DOCUMENTS

| | | |
|---|---|---|
| CN | 114021718 A | 2/2022 |

OTHER PUBLICATIONS

Marecek et al., Hidden in the Layers: Interpretation of Neural Networks for Natural Language Processing, Studies in Computational and Theoretical Linguistics, 2020. (Year: 2020).*

(Continued)

*Primary Examiner* — Marshall L Werner
(74) *Attorney, Agent, or Firm* — Harrity & Harrity, LLP

(57)                    ABSTRACT
A computer-implemented process for training a neural network having a plurality of transform layers includes the following operations. Input data for one transform layer of the plurality of transform layers is transformed by the one transform layer into output data. A neural-backed decision tree is generated for the transform layer, a neural-backed decision tree. The transforming and the generating are repeated for each of the plurality of transform layers. A neural-backed decision tree map for a particular one of the plurality of transform layers maps output data of the particular one of the plurality of transform layers into a list of interpretable words from a generative search domain of facts and evidence.

20 Claims, 8 Drawing Sheets

(56) References Cited

OTHER PUBLICATIONS

Binder et al., Layer-wise Relevance Propagation for Neural Networks with Local Renormalization Layers, Apr. 2016. (Year: 2016).*

Ribeiro et al., Why Should I Trust You? Explaining the Predictions of Any Classifier, Aug. 2016. (Year: 2016).*

Tang et al., It Takes Two Flints to Make a Fire: Multitask Learning of Neural Relation and Explanation Classifiers, Apr. 2022. (Year: 2022).*

Mouton et al., Exploring Layerwise Decision Making in DNNs, Feb. 2022. (Year: 2022).*

Yang, C. et al., "Global model interpretation via recursive partitioning," In2018 IEEE 20th International Conference on High Performance Computing and Communications; IEEE 16th International Conference on Smart City; IEEE 4th International Conference on Data Science and Systems (HPCC/SmartCity/DSS), Jun. 28, 2018, pp. 1563-1570, IEEE.

Mell, P. et al., The NIST Definition of Cloud Computing, National Institute of Standards and Technology, U.S. Dept. of Commerce, Special Publication 800-145, Sep. 2011, 7 pg.

* cited by examiner

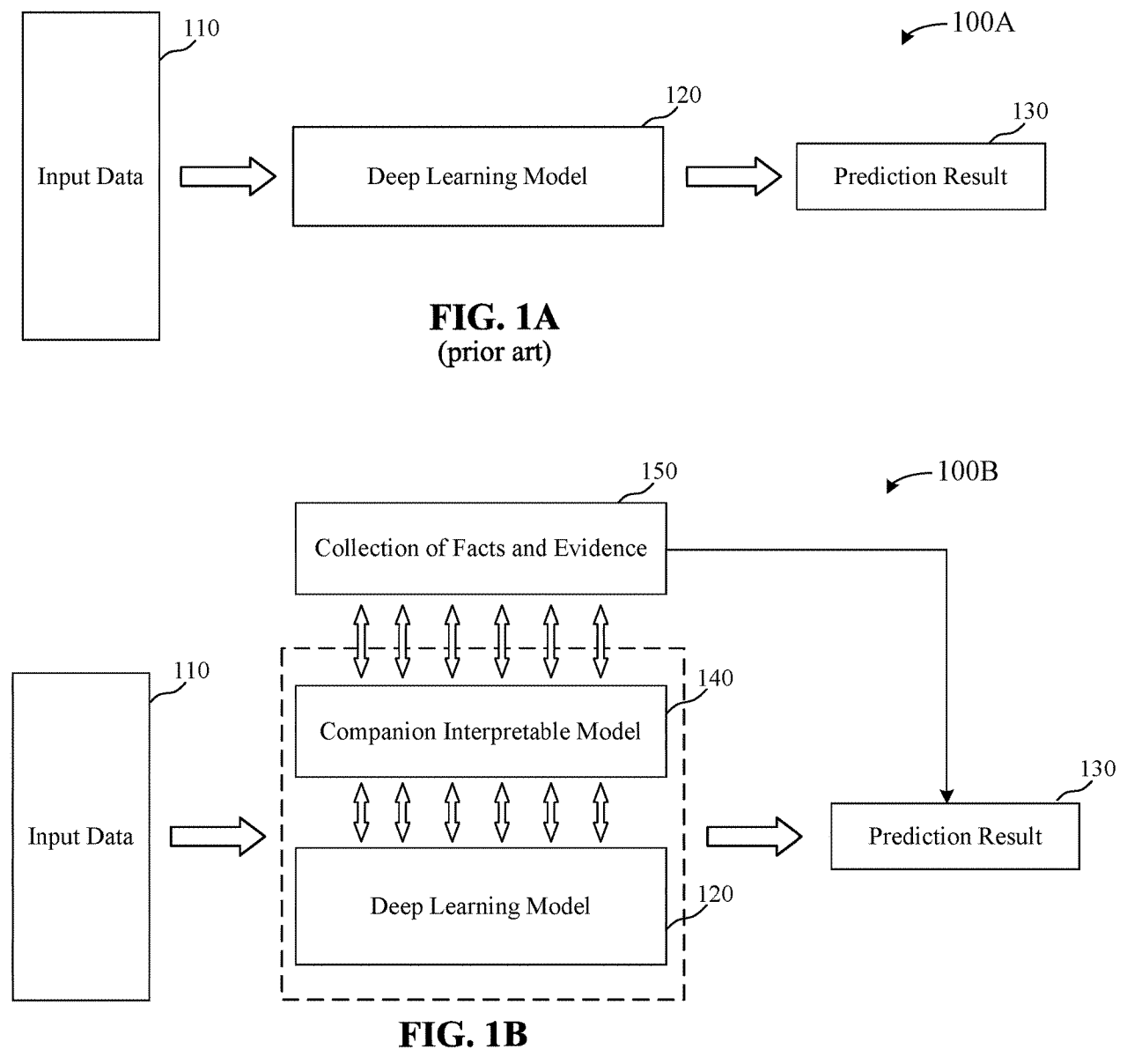

100A

Input Data
110

Deep Learning Model
120

Prediction Result
130

Input Data
110

Deep Learning Model
120

Companion Interpretable Model
140

Collection of Facts and Evidence
150

Prediction Result
130

FIG. 1B

Target Q value                    Predicted Q value $$L\,(\theta) = [((r + \gamma max_{at+1}\;\; Q(s_{t+1}, a_{t+1};\; \theta^{target})) - Q(s,a;\theta^{pred}))^2]$$

LOCAL INTERPRETABILITY ARCHITECTURE FOR A NEURAL NETWORK

BACKGROUND

The present invention relates to machine learning, and more specifically, to generating a local interpretability architecture for a neural network.

Having artificial intelligence (AI) be trustworthy is important for the adoption of AI technology (examples of which are machine learning, deep learning, and neural networks, which are collectively referred to herein as machine learning engines or machine learning models). One aspect of generating trustworthy AI is the generation of explainable AI. Explainable AI (sometimes abbreviated XAI and also referred to as interpretable AI) refers to AI in which humans can understand the methodology that leads to the decisions/predictions/recommendations generated by the AI as well as the errors that are made by the AI. In a neural network, for example, there is an input layer that receives input data of the neural network, a multitude of intermediary layers (also referred to as hidden layers), and an output layer that generates the output data of the neural network. A neural network is oftentimes analogized to an uninterpretable black box as how the individual neurons (i.e., nodes) of a neural network transforms the input data into the output data is unknown.

Different approaches have been used to address the interpretability of AI. These approaches are typically divided into two categories: ante-hoc interpretability and post-hoc interpretability. Ante-hoc interpretability techniques involve ensuring interpretability of the machine learning models at the beginning. Examples of ante-hoc machine learning models are explainable neural networks (xNNs), explainable boosting machines (EBMs), supersparse linear integer models (SLIMs), reversed time attention model (RETAIN), and Bayesian deep learning (BDL). A disadvantage of some ante-hoc interpretability techniques involves the use of a linear model represented by a decision tree, which does not have the same accuracy of a deep learning model.

Examples of post-hoc interpretability techniques include Local Interpretable Model-agnostic Examples (LIME) and Layer-wise Relevance Propagation (LRP). In LIME, the machine learning model is probed with new input data to result in corresponding predictions. This dataset of new input data and corresponding predictions is then used to train an interpretable model. The interpretable model is also weighted based upon the new input data. One disadvantage with a post-hoc technique is that there is a disconnect between the interpretation method and the training process, and its interpretation is difficult to be extended.

Some of the failures of the above-described approaches can be attributed to a desire to generate a full and complete explanation of a machine learning model, which forces the use of decision and linear models for explainability regardless of the whether these approaches are suitable for a particular application. In many instances, the creators/users of machine learning models do not actually seek to "fully explain" their models but simply want to know the coarse-grained data and evidence that the models rely upon to make predictions.

SUMMARY

A computer-implemented process for training a neural network having a plurality of transform layers includes the following operations. Input data for one transform layer of the plurality of transform layers is transformed by the one transform layer into output data. A neural-backed decision tree is generated for the transform layer, a neural-backed decision tree. The transforming and the generating are repeated for each of the plurality of transform layers. A neural-backed decision tree map for a particular one of the plurality of transform layers maps output data of the particular one of the plurality of transform layers into a list of interpretable words from a generative search domain of facts and evidence.

In other aspects of the process, the neural-backed decision tree map for the particular one of the plurality of transform layers shares input data for the particular one of the plurality of transform layers. The list of interpretable words for each of the plurality of transform layers are combined as a combined output, and the combined output is displayed to a user. The list of interpretation words for the particular one of the plurality of transform layers is a display representation of hidden layer features of the particular one of the plurality of transform layers. The neural network is one of a recommendation neural network, a computer vision neural network, and a natural language processing neural network. The generative search domain of facts and evidence includes a word list of the neural network prior to training. The neural network can be a Bidirectional Encoder Representations from Transformers (BERT), and the list of words is selected from a BERT training word list.

A computer hardware system for training a neural network having a plurality of transform layers includes a hardware processor configured to perform the following executable operations. Input data for one transform layer of the plurality of transform layers is transformed by the one transform layer into output data. A neural-backed decision tree is generated for the transform layer, a neural-backed decision tree. The transforming and the generating are repeated for each of the plurality of transform layers. A neural-backed decision tree map for a particular one of the plurality of transform layers maps output data of the particular one of the plurality of transform layers into a list of interpretable words from a generative search domain of facts and evidence.

In other aspects of the hardware system, the neural-backed decision tree map for the particular one of the plurality of transform layers shares input data for the particular one of the plurality of transform layers. The list of interpretable words for each of the plurality of transform layers are combined as a combined output, and the combined output is displayed to a user. The list of interpretation words for the particular one of the plurality of transform layers is a display representation of hidden layer features of the particular one of the plurality of transform layers. The neural network is one of a recommendation neural network, a computer vision neural network, and a natural language processing neural network. The generative search domain of facts and evidence includes a word list of the neural network prior to training. The neural network can be a Bidirectional Encoder Representations from Transformers (BERT), and the list of words is selected from a BERT training word list.

A computer program product includes a computer readable storage medium having stored therein program code for training a neural network having a plurality of transform layers. The program code, which when executed by a computer hardware system, cause the computer hardware system to perform the following. Input data for one transform layer of the plurality of transform layers is transformed by the one transform layer into output data. A neural-backed decision tree is generated for the transform layer, a neural-backed decision tree. The transforming and the generating are repeated for each of the plurality of transform layers. A neural-backed decision tree map for a particular one of the plurality of transform layers maps output data of the particular one of the plurality of transform layers into a list of interpretable words from a generative search domain of facts and evidence.

In other aspects of the computer program product, the neural-backed decision tree map for the particular one of the plurality of transform layers shares input data for the particular one of the plurality of transform layers. The list of interpretable words for each of the plurality of transform layers are combined as a combined output, and the combined output is displayed to a user. The list of interpretation words for the particular one of the plurality of transform layers is a display representation of hidden layer features of the particular one of the plurality of transform layers. The neural network is one of a recommendation neural network, a computer vision neural network, and a natural language processing neural network. The generative search domain of facts and evidence includes a word list of the neural network prior to training. The neural network can be a Bidirectional Encoder Representations from Transformers (BERT), and the list of words is selected from a BERT training word list.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIGS. 1A and 1B respectively schematically illustrate a prior art machine learning architecture and machine learning architecture according to an embodiment of the present invention.

DETAILED DESCRIPTION

Figure 2:
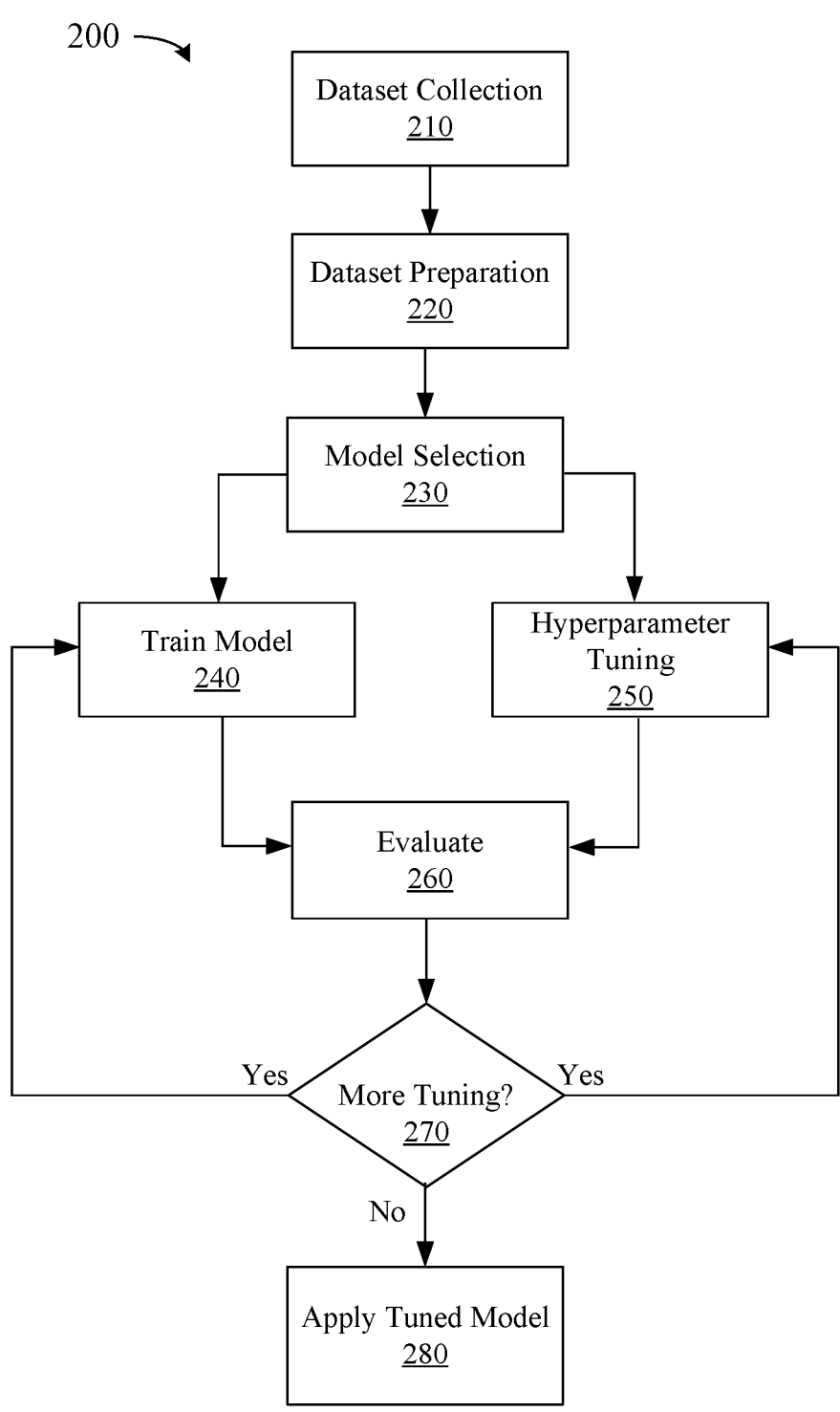
FIG. 2 is a flowchart of a typical reinforced learning (RL) approach.

FIGS. 1A and 1B respectively illustrate a prior art machine learning architecture 100A and an inventive machine learning architecture 100B according to the present disclosure. A typical prior art architecture 100A includes a typical deep learning model 120 that receives input data 110 that is used to generate a prediction result 130. Although referred to herein as a "prediction" result, depending upon the deep learning model 120, the result (i.e., output) may not necessarily be a prediction. The result, for example, could be a recommendation, decision, and/or identification. The inventive machine learning architecture 100B improves the interpretability of the underlying deep learning model 120 by employing a companion interpretable model 140 that provides local interpretability of the deep learning model 120 using a generative search domain of facts and evidence 150.

As will be subsequently discussed, the interpretable model 140 is comprised of a plurality of neural-backed decision tree maps respectively for each one of the plurality of transform layers in the deep learning model 120. Each of the plurality of transform layers maps output data of the particular one of the plurality of transform layers into a list of interpretable words from the generative search domain of facts and evidence 150. This list of interpretable words is a direct reflection of the deep learning model 120 and not a post-hoc interpretation of the deep learning model 120 such as with the LIME approach.

With reference to FIG. 2, a generic process 200 for training machine learning model is disclosed. In 210, the data used for the dataset is collected. As conventionally known, the quality of the machine learning model (e.g., a neural network) being trained is dependent upon the quantity and quality of the data in the dataset. In 220, the data in the dataset is prepared, and this may involve a wide variety of different operations. For example, if the data comes from different sources, the data may require normalization and data type conversions. Also, duplicate data may be removed and errors/omissions in the data may be corrected. The data can also be randomized to reduce the impact of the particular order in which the data is collected and/or prepared.

The dataset can also be split up into multiple portions. One portion of the dataset (referred to herein as the training dataset), which is typically the largest portion, is used to train the model (e.g., tune the parameters of the model). Another portion of the dataset (referred to herein as the test dataset) is used to validate the final trained model. Still another portion of the dataset (referred to herein as the validation dataset) is used to tune hyperparameters. In certain instances, K-fold cross-validation can be used as part of model training.

In 230, the model to be trained is selected. There are a number of known models that can be used with machine learning. A non-exclusive list of these models includes linear regression, Deep Neural Networks (DNN), logistic regression, and decision trees. Depending upon the type of solution needed for a particular application, one or more models may be better suited.

In 240, the parameters of the model are tuned. There are many different types of known techniques used to train a model. Some of these techniques are discussed in further detail with regard to FIGS. 2A-2B. In 250, hyperparameters can be tuned. Hyperparameters are variables that govern the training process itself and differ from input data (i.e., the training data) and the parameters of the model. Examples of hyperparameters include, for example, the number of hidden layers in a DNN between the input layer and the output layer. Other examples include number of training steps, learning rate, and initialization values. In certain instances, the validation dataset can be used as part of this tuning process. Although illustrated as being separate from the tuning of the parameters of model in 250, the tuning of the hyperparameters can be performed in parallel with or in series with the tuning of the parameters of the model in 240.

In 260, the parameters of the model and the hyperparameters are evaluated. This typically involves using some metric or combination of metrics to generate an objective descriptor of the performance of the model. The evaluation typically uses data that has yet to be seen by the model (e.g., the test dataset). The operations of 240-360 continue until a determination, in 270, that no additional tuning is to be performed. In 280, the tuned model can then be applied to real-world data.

Figure 3A:
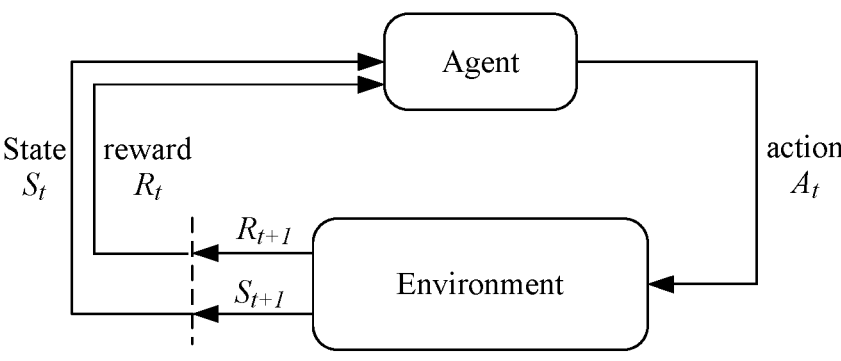
FIGS. 3A and 3B are block diagrams respectively schematically illustrating a reinforced learning (RL) approach and a deep Q-learning approach (DQN).
Figure 3B:
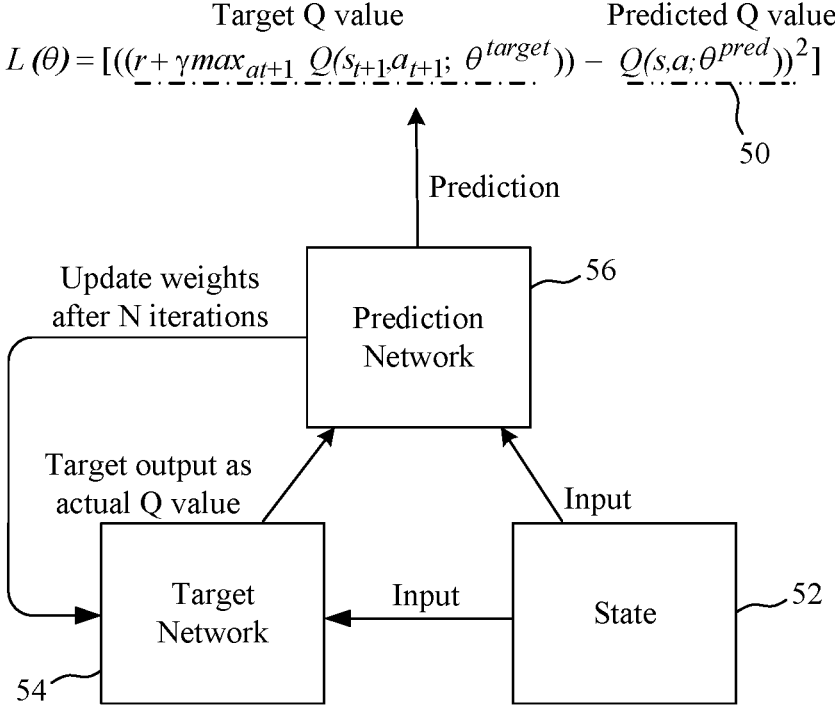

FIGS. 3A and 3B are block diagrams respectively illustrating a reinforced learning (RL) approach and a deep Q-learning approach (DQN) for training a model. Machine learning paradigms include supervised learning (SL), unsupervised learning (UL), and reinforced learning (RL). RL differs from SL by not requiring labeled input/output pairs and not requiring sub-optimal actions to be explicitly corrected. FIG. 2A schematically illustrates a generic RL approach. In describing RL, the following terms are oftentimes used. The "environment" refers to the world in which the agent operates. The "State" ($S_t$) refers to a current situation of the agent. Each State ($S_t$) may have one or more dimensions that describe the State. The "reward" ($R_t$) is feedback from the environment (also illustrated as "r" in FIG. 3B), which is used to evaluate actions ($A_t$) taken by the agent. In other words, a reward function, which is part of the environment, generates the reward ($R_t$), and the reward function reflects the desired goal of the model being trained. The "policy" is a methodology by which to map the State ($S_t$) of the agent to certain actions ($A_t$). The "value" is a future reward received by an agent by taking an action ($A_t$) in a particular State ($S_t$). Ultimately, the goal of the agent is to generate actions ($A_t$) that maximize the reward function.

Examples of RL algorithms that may be used include Markov decision process (MDP) (i.e., the methodology illustrated in FIG. 3A), Monte Carlo methods, temporal difference learning, Q-learning, Deep Q Networks (DQN), State-Action-Reward-State-Action (SARSA), a distributed cluster-based multi-agent bidding solution (DCMAB), and the like. FIG. 2B illustrates one example of the operation of a DQN model. DQN is a combination of deep learning (i.e., neural network based) and reinforced learning. Deep learning is another subfield of machine learning that involves artificial neural networks. An example of a computer system that employs deep learning is IBM's Watson. While the terms "neural network" and "deep learning" are oftentimes used interchangeably, by popular convention, deep learning (e.g., with a DNN), refers to a neural network with more than three layers inclusive of the inputs and the output. A neural network with just two or three layers is considered just a basic neural network.

A neural network can be seen as a universal functional approximator that can be used to replace the Q-table used in Q-learning. In a DQN model, the loss function 50 is represented as a squared error of the target Q value and prediction Q value. Error is minimized by optimizing the weights, θ. In DQN, two separate networks (i.e., target network 54 and prediction network 56 having the same architecture) can be respectively employed to estimate target and prediction Q values based upon state 52. The result from the target model is treated as a ground truth for the prediction network 56. The weights for the prediction network 56 get updated every iteration and the weights of the target network 54 get updated with the prediction network 56 after N iterations.

Figure 4:
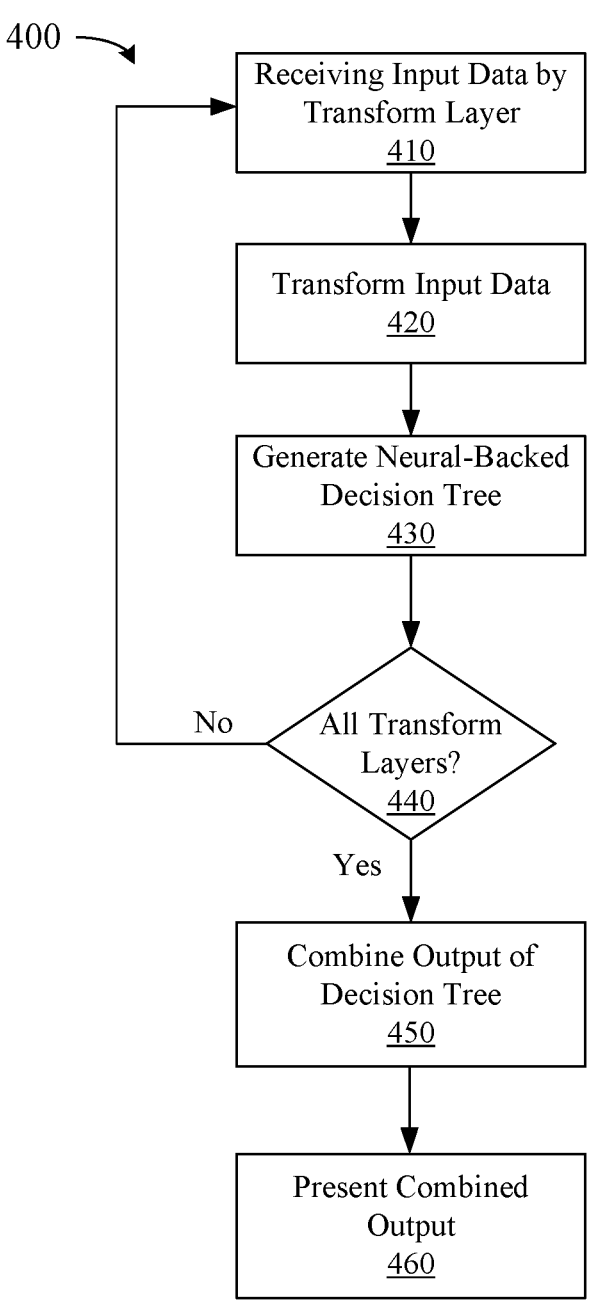
FIG. 4 is a flowchart illustrating the generation of the machine learning architecture of FIG. 1B according to an embodiment of the present invention.
Figure 5:
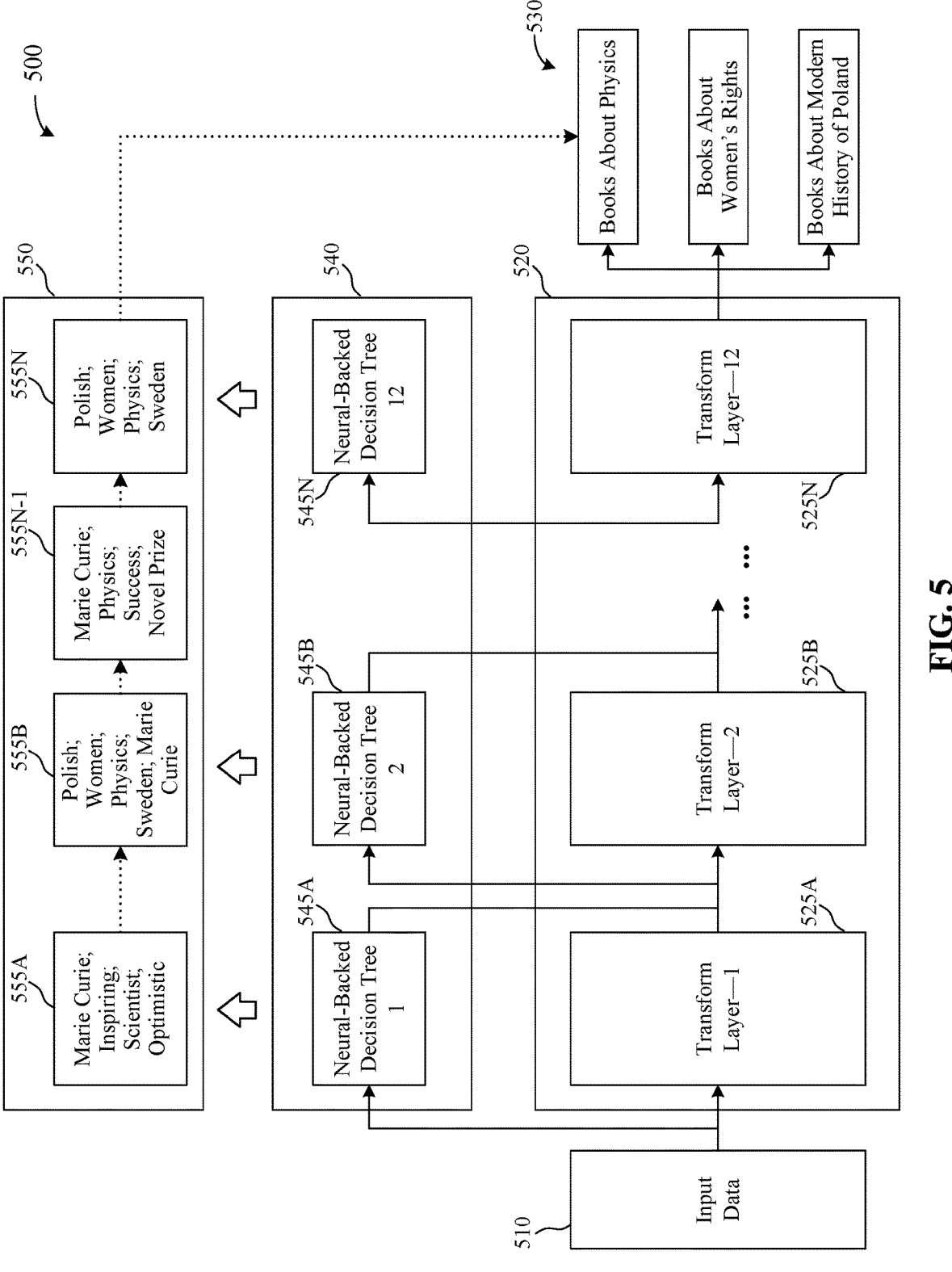
FIG. 5 is a more detailed schematic illustration of the machine learning architecture of FIG. 1B.
Figure 6:
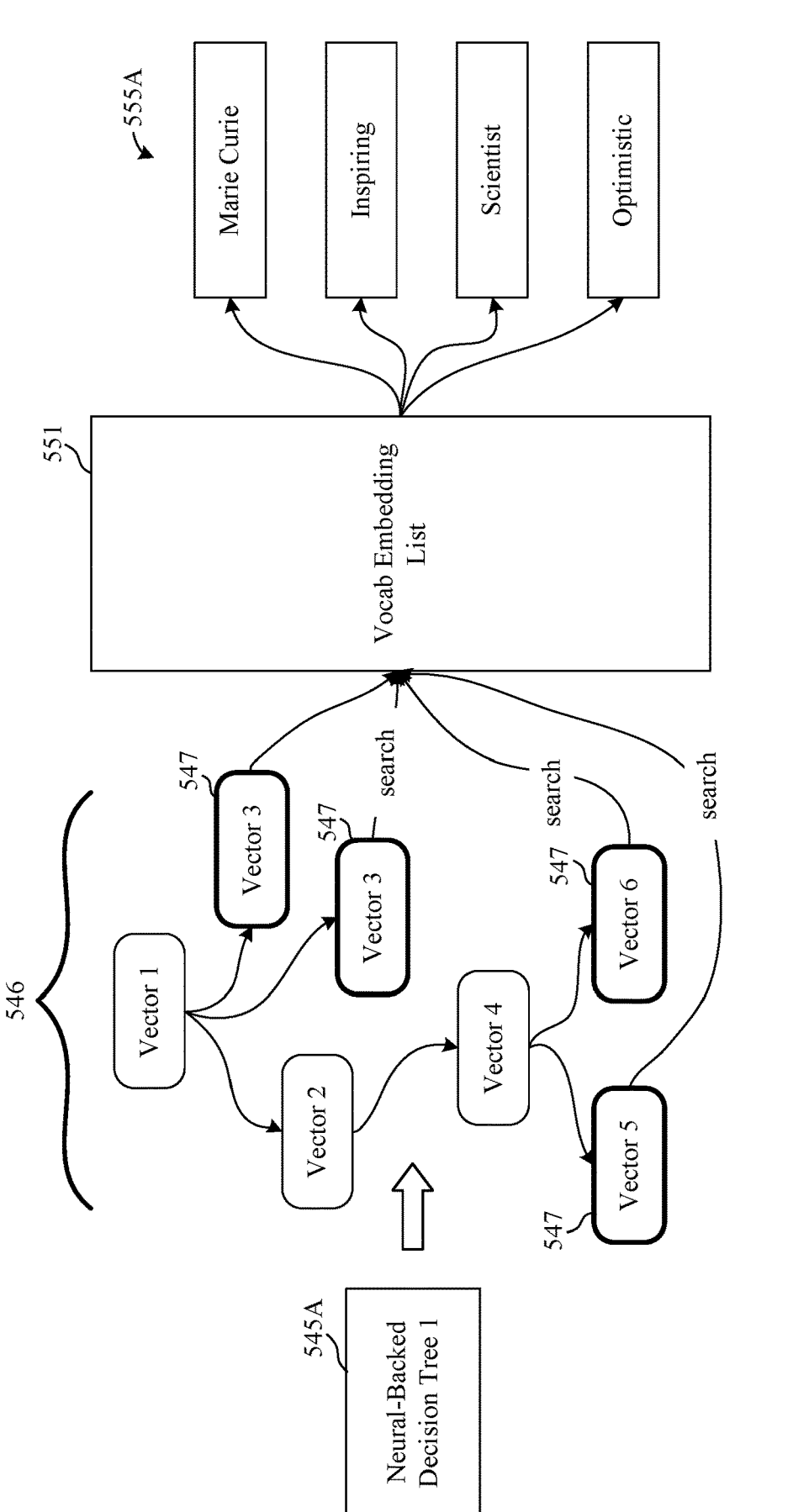
FIG. 6 is a schematic illustration of a neural-backed decision tree according to an embodiment of the present invention.
Figure 7:
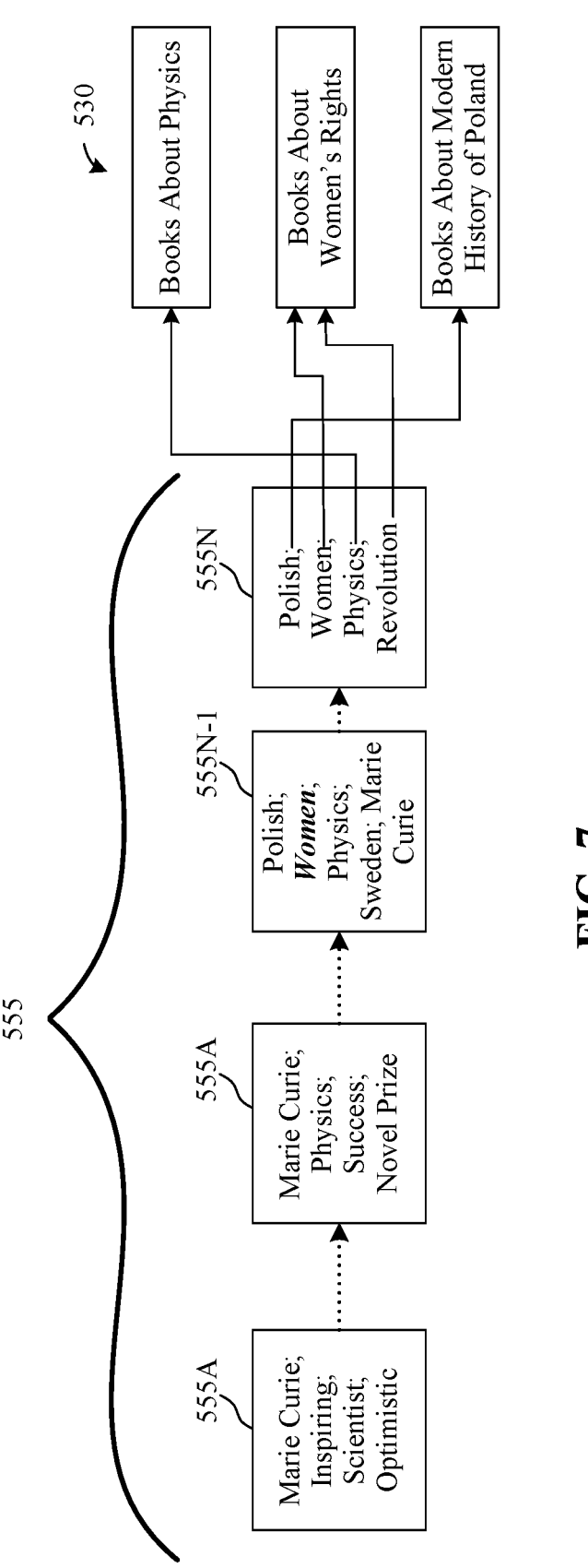
FIG. 7 is a schematic illustration of a factual logical link using a generative search domain of facts and evidence according to an embodiment of the present invention.

FIG. 4 and the schematic diagrams of FIGS. 5-7 provide a further explanation of the generation and use of the inventive machine learning architecture 100B of FIG. 1B using a methodology 400 for training a neural network 520 having a plurality of transform layers 525A-N. In 410, input data 510 is received consistent with the discussion regarding operations 210, 220 in FIG. 1.

In 420, input data 510 received by a transform layer 525A is transformed into output data. This output data is then used as input data from the next transform layer 525B. This process continues until the output data 530 of the final transform layer 525N serves as the output data 530 of the neural network 520.

In 430 and during the training of the of the neural network 520, a neural-backed decision tree 545A-N is generated for each of the transform layers 525A-N. In 440, a determination is made whether the transform layer 525A-N is the last transform layer 525N. If not, the process 400 repeats until neural-backed decision trees 545A-N are generated for each of the transform layers 525A-N. In 450, outputs 555A-N of each the neural-backed decision trees 545A-N are combined into a list of interpretable words 555 from a generative search domain 550 of facts and evidence. This combined output 555 can then be presented to a creator/user of the neural network 520.

Reference is made to FIG. 5, which illustrates an example of the inventive architecture 100B illustrated in FIG. 1B. Although this example is in the context of a recommendation system, the inventive architecture 100B can be employed to many scenarios using deep learning machine learning models—example of which include computer vision and natural language processing. In this particular example, a Bidirectional Encoder Representations from Transformers (BERT) neural network 520 is employed which consists of 12 layers 525A-N. This conventional neural network 520 is augmented by providing each layer 525A-N of the deep learning network with a neural-backed decision tree 545A-N.

In the provided example, the text of "These behaviors of Marie Curie are very inspiring to me, I feel that the whole person has become very optimistic, and I really want to become an outstanding woman like her" is received as input data 510 into the neural network 520. Based upon the input data 510, the neural network 520 ultimately generates three recommendations: (i) a book about physics, (ii) a book about women's rights, and (iii) a book about Polish modern history. The neural network 520 by itself lacks interpretation since a creator/user of the neural network 520 will have difficulty understanding why the input data 510 is related, for example, to the recommendation for a book about Polish modern history.

Each of these neural-backed decision trees 525A-N share the input data that is inputted into the transform layer 525A-N to which the individual neural-backed decision tree 545A-N is respectively attached. The neural-backed decision tree 545A-N corresponding to each layer 525A-N of the deep neural network 520 maps the output of that layer 525A-N into a list of words 555 (which comes from the word list at the time of BERT training and not from the training dataset). This list of words 555 can subsequently be outputted to a creator/user of the neural network 520. These words 555 are display representations of the hidden layer features of each layer 525A-N of the neural network 520, and these display representations respond to changes in semantics during training. The words 555 themselves can be understood (i.e., are interpretable) by humans and can be used as evidence and facts to support a final human decision with regard to the neural network 520. In this manner, an interpretable output 555A-N is provided for each layer 525A-N of the deep learning network 520. However, the ambiguity of the original deep neural network 520 can be preserved in the connection phase (parameter dense area) of each layer 525A-N of the network, which has the advantage of ensuring that the fitting ability of the deep learning network 520 itself is not sacrificed for the pursuit of interpretability. However, the local interpretability of each layer 525A-N of the neural network 520 can be approximated by the local interpretability of the neural backed decision tree 545A-N.

FIG. 6 is a schematic illustration of a neural-backed decision tree 545A associated with a particular one of the transform layers 525A of the neural network 520. The neural-backed decision tree 545A is comprised of a plurality of nodes 546. An advantage of a neural-backed decision tree 545A is that decision trees provide a high-level of interpretability. However, interpretability of a decision tree lessens as the depth of the tree increases. An advantage of adding the neural-backed decision trees 545 to the architecture 100B is to disassemble each layer 525A-N of the deep learning neural network 520 independently and observe its interpretability in specific tasks.

Since the parameters of each layer 525A-N of the deep learning neural network 520 are not large, a shallow model like the neural-backed decision tree 545A can be fitted well without overfitting. Additionally, the neural decision tree 545A is not isolated from the deep learning model 520. Rather, the neural decision tree 545 is generated as part of the training process for the deep learning neural network 520. Thus, the data distribution represented by the neural-backed decision tree 545 s is approximately the same as that of the deep learning neural network 520. The hidden vector output from the neural decision tree 545A for a particular layer 525N can be used as a representative of features learned by the deep neural network 520 in that layer 525N. Since decisions trees 545A generally have good interpretability, the output 555A of the neural-backed decision tree 545A also has good interpretability.

In this particular example, all words in the word list 555A generated by the neural-backed decision tree 545 are derived from the BERT training word list 551 (each pre-trained language model comes with a word list signifying the width of the model's features), and the word list 555A is derived from the most similar words selected by matching the similarity of the hidden layer vector represented by each leaf node 547 of the neural decision tree 545A with the word vector in the training word list 551.

FIG. 7 is a schematic illustration of a factual logical link 555 using the generative search domain of facts and evidence of FIG. 5. The factual logical link 555 (e.g., list of words) comprises the facts and evidence 555A-N generated by the neural-backed decisions trees 545A-N. Continuing with the example described above, the first layer 525A of the neural network 520 is "Marie Curie, inspiring, scientist, and optimistic." These words are from the original input data 510. As the layers 525B-N of the neural network 520 deepen, the features learned by the neural network 520 gradually start to abstract, and in the last layers 542N, words such as Poland, women, and revolution start to appear as part of the facts and evidence 555N-1, 555N. ince the output 530 of the deep learning neural network 520 mainly uses the last layer 525N of features, the recommended result of Polish modern history can be interpreted as relating to the feature Poland, and books about women's rights may be interpreted as relating related to the features of women and revolution. Consequently, the facts and evidence 555A-N generated by the neural-backed decisions trees 545A-N provide interpretability of the neural network 520.

In the example provided and with regard to interpretability of the neural network 520 as a whole, it is not necessarily clear what precise words in the original data input 510 correspond to the answers in the data output 530. Also, it is also not necessarily clear how the focus of each layer 525A-N shifts within the neural network 520, as the learned concepts become increasingly higher-order and abstract. Accordingly, the neural network 520 as a whole is not necessarily fully-interpretable However, by employing the inventive machine learning architecture 100B, a creator/user of a neural network 520 can obtain the focus of each layer 525A-N of the neural network 520 by using the factual output 555A-N of each layer 525A-N. Also, the locally-interpretable output 55A-N of each layer 525A-N of the deep neural network 520 can be considered in combination to provide a creator/user of the neural network 520 with insight (i.e., interpretability) as to how the output 530 is generated from the input 510.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 8:
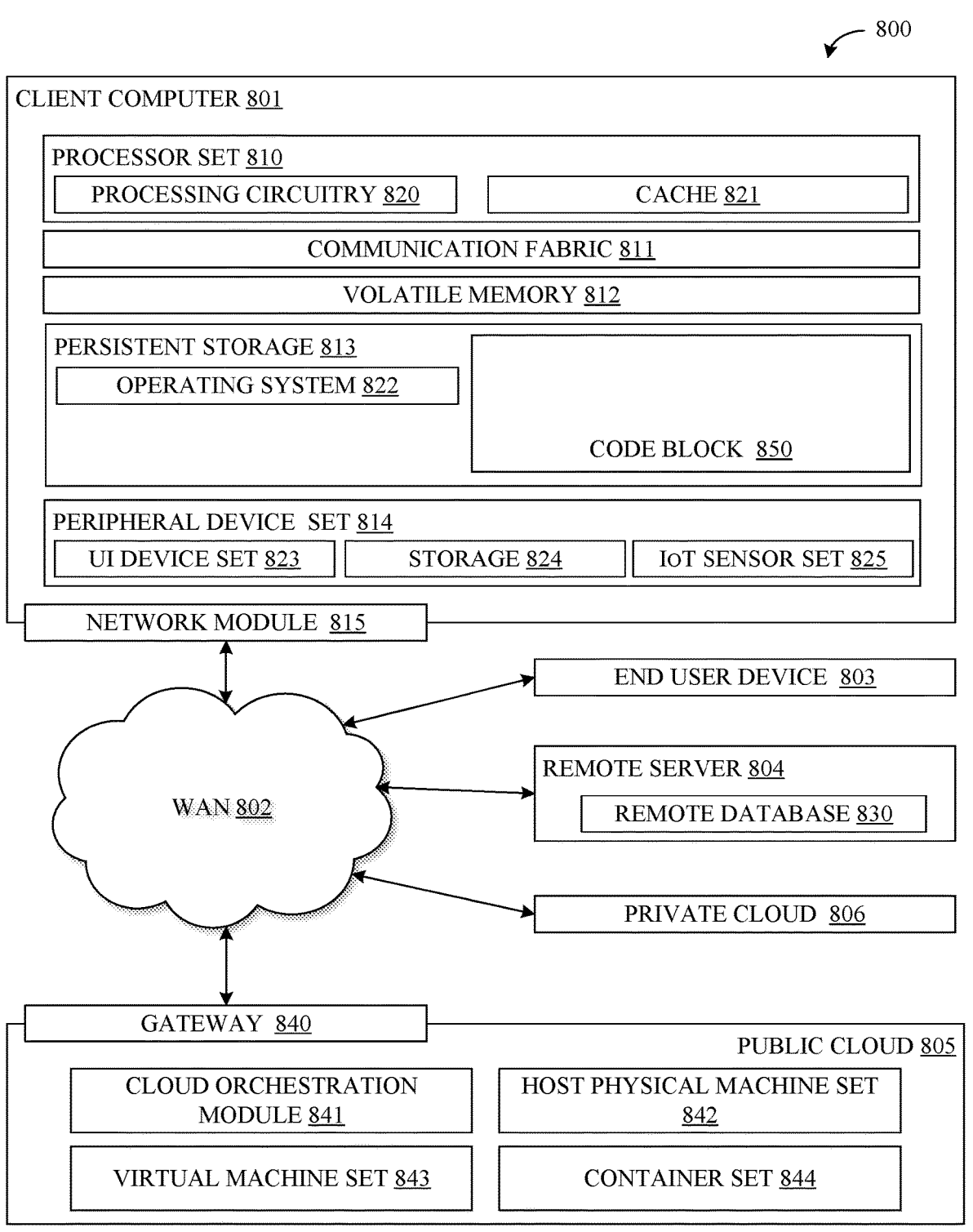
FIG. 8 is a block diagram illustrating an example of computer environment for implementing the methodology of FIG. 4.

Referring to FIG. 8, computing environment 800 contains an example of an environment for the execution of at least some of the computer code involved in performing the inventive methods, such as code block 850 for generating/using the inventive machine learning architecture of FIG. 1B. Computing environment 800 includes, for example, computer 801, wide area network (WAN) 802, end user device (EUD) 803, remote server 804, public cloud 805, and private cloud 806. In certain aspects, computer 801 includes processor set 810 (including processing circuitry 820 and cache 821), communication fabric 811, volatile memory 812, persistent storage 813 (including operating system 822 and method code block 850), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. However, to simplify this presentation of computing environment 800, detailed discussion is focused on a single computer, specifically computer 801. Computer 801 may or may not be located in a cloud, even though it is not shown in a cloud in FIG. 8 except to any extent as may be affirmatively indicated.

Processor set 810 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In certain computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in code block 850 in persistent storage 813.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 811 is the signal conduction paths that allow the various components of computer 801 to communicate with each other. Typically, this communication fabric 811 is made of switches and electrically conductive paths, such as the switches and electrically conductive paths that make up busses, bridges, physical input/output ports and the like. Other types of signal communication paths may be used for the communication fabric 811, such as fiber optic communication paths and/or wireless communication paths.

Volatile memory 812 is any type of volatile memory now known or to be developed in the future. Examples include dynamic type random access memory (RAM) or static type RAM. Typically, the volatile memory 812 is characterized by random access, but this is not required unless affirmatively indicated. In computer 801, the volatile memory 812 is located in a single package and is internal to computer 801. In addition to alternatively, the volatile memory 812 may be distributed over multiple packages and/or located externally with respect to computer 801.

Persistent storage 813 is any form of non-volatile storage for computers that is now known or to be developed in the future. The non-volatility of the persistent storage 813 means that the stored data is maintained regardless of whether power is being supplied to computer 801 and/or directly to persistent storage 813. Persistent storage 813 may be a read only memory (ROM), but typically at least a portion of the persistent storage 813 allows writing of data, deletion of data and re-writing of data. Some familiar forms of persistent storage 813 include magnetic disks and solid state storage devices. Operating system 822 may take several forms, such as various known proprietary operating systems or open source Portable Operating System Interface type operating systems that employ a kernel. The code included in code block 850 typically includes at least some of the computer code involved in performing the inventive methods.

Peripheral device set 814 includes the set of peripheral devices for computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some aspects, storage 824 may take the form of a quantum computing storage device for storing data in the form of qubits. In aspects where computer 801 is required to have a large amount of storage (for example, where computer 801 locally stores and manages a large database) then this storage 824 may be provided by peripheral storage devices designed for storing very large amounts of data, such as a storage area network (SAN) that is shared by multiple, geographically distributed computers. Internet-of-Things (IoT) sensor set 825 is made up of sensors that can be used in IoT applications. For example, one sensor may be a thermometer and another sensor may be a motion detector.

Network module 815 is the collection of computer software, hardware, and firmware that allows computer 801 to communicate with other computers through a Wide Area Network (WAN) 802. Network module 815 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 815 are performed on the same physical hardware device. In other aspects (for example, aspects that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any Wide Area Network (for example, the internet) capable of communicating computer data over non-local distances by any technology for communicating computer data, now known or to be developed in the future. In some aspects, the WAN 802 ay be replaced and/or supplemented by local area networks (LANs) designed to communicate data between devices located in a local area, such as a Wi-Fi network. The WAN 802 and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In certain aspects, EUD 803 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804. As defined herein, the term "server" means a data processing system configured to share services with one or more other data processing systems.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other aspects, a private cloud 806 may be disconnected from the internet entirely (e.g., WAN 802) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time. As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method for training a neural network having a plurality of transform layers, comprising:

transforming, by one transform layer of the plurality of transform layers, input data for the one transform layer into output data;

generating, for the transform layer, a neural-backed decision tree; and repeating the transforming and the generating for each of the plurality of transform layers, wherein a particular neural-backed decision tree for a particular one of the plurality of transform layers is configured to:

share input with the particular one of the plurality of transform layers; and map output data of the particular one of the plurality of transform layers into a list of interpretable words from a training word list associated with a generative search domain of facts and evidence based on matching a similarity of a hidden state vector of a leaf node of a plurality of nodes of the particular neural-backed decision tree with a word vector in a training word list.

2. The method of claim 1, wherein
the list of interpretable words for each of the plurality of
transform layers are combined as a combined output,
and
the combined output is displayed to a user.
3. The method of claim 2, wherein
the list of interpretable words for the particular one of the
plurality of transform layers is a display representation
of hidden layer features of the particular one of the
plurality of transform layers.
4. The method of claim 1, wherein
the neural network is one of a recommendation neural
network, a computer vision neural network, and a
natural language processing neural network.
5. The method of claim 1, wherein
the generative search domain of facts and evidence
includes a word list of the neural network prior to
training.
6. The method of claim 1, wherein
the neural network is Bidirectional Encoder Representa-
tions from Transformers (BERT), and
the list of words is selected from a BERT training word
list.
7. The method of claim 1, wherein the training word list
signifies a width of features of neural network.
8. A computer hardware system for training a neural
network having a plurality of transform layers, comprising:
a hardware processor configured to perform the following
executable operations:
transforming, by one transform layer of the plurality of
transform layers, input data for the one transform
layer into output data;
generating, for the transform layer, a neural-backed
decision tree; and
repeating the transforming and the generating for each
of the plurality of transform layers, wherein
a particular neural-backed decision tree for a par-
ticular one of the plurality of transform layers is
configured to:
share input with the particular one of the plurality
of transform layers; and
map output data of the particular one of the
plurality of transform layers into a list of inter-
pretable words from a training word list asso-
ciated with a generative search domain of facts
and evidence based on matching a similarity of
a hidden state vector of a leaf node of a plurality
of nodes of the particular neural-backed deci-
sion tree with a word vector in a training word
list.
9. The system of claim 8, wherein
the list of interpretable words for each of the plurality of
transform layers are combined as a combined output,
and
the combined output is displayed to a user.
10. The system of claim 9, wherein
the list of interpretable words for the particular one of the
plurality of transform layers is a display representation
of hidden layer features of the particular one of the
plurality of transform layers.
11. The system of claim 8, wherein
the neural network is one of a recommendation neural
network, a computer vision neural network, and a
natural language processing neural network.

12. The system of claim 8, wherein
the generative search domain of facts and evidence
includes a word list of the neural network prior to
training.
13. The system of claim 8, wherein
the neural network is Bidirectional Encoder Representa-
tions from Transformers (BERT), and
the list of words is selected from a BERT training word
list.
14. The system of claim 8, wherein the training word list
signifies a width of features of neural network.
15. A computer program product, comprising:
a computer readable storage medium having stored
therein program code for training a neural network
having a plurality of transform layers,
the program code, which when executed by a computer
hardware system, cause the computer hardware system
to perform:
transforming, by one transform layer of the plurality of
transform layers, input data for the one transform
layer into output data;
generating, for the transform layer, a neural-backed
decision tree; and
repeating the transforming and the generating for each
of the plurality of transform layers, wherein
a particular neural-backed decision tree map for a
particular one of the plurality of transform layers
is configured to:
share input with the particular one of the plurality
of transform layers; and
map output data of the particular one of the
plurality of transform layers into a list of inter-
pretable words from a training word list asso-
ciated with a generative search domain of facts
and evidence based on matching a similarity of
a hidden state vector of a leaf node of a plurality
of nodes of the particular neural-backed deci-
sion tree with a word vector in a training word
list.
16. The computer program product of claim 15, wherein
the list of interpretable words for each of the plurality of
transform layers are combined as a combined output,
the list of interpretable words for the particular one of
the plurality of transform layers is a display repre-
sentation of hidden layer features of the particular
one of the plurality of transform layers, and
the combined output is displayed to a user.
17. The computer program product of claim 15, wherein
the neural network is one of a recommendation neural
network, a computer vision neural network, and a
natural language processing neural network.
18. The computer program product of claim 15, wherein
the generative search domain of facts and evidence
includes a word list of the neural network prior to
training.
19. The computer program product of claim 15, wherein
the neural network is Bidirectional Encoder Representa-
tions from Transformers (BERT), and
the list of words is selected from a BERT training word
list.
20. The computer program product of claim 15, wherein
the training word list signifies a width of features of neural
network.

* * * * *